(12) United States Patent
Ober

(10) Patent No.: US 6,665,802 B1
(45) Date of Patent: Dec. 16, 2003

(54) POWER MANAGEMENT AND CONTROL FOR A MICROCONTROLLER

(75) Inventor: Robert E. Ober, San Jose, CA (US)

(73) Assignee: Infineon Technologies North America Corp., San Jose, CA (US)

(*) Notice: Subject to any disclaimer, the term of this patent is extended or adjusted under 35 U.S.C. 154(b) by 0 days.

(21) Appl. No.: 09/516,447

(22) Filed: Feb. 29, 2000

(51) Int. Cl.$^7$ ............................................. G06F 1/32
(52) U.S. Cl. ................................... 713/320; 713/324
(58) Field of Search .............................. 713/300, 310, 713/320, 323, 324

(56) References Cited

U.S. PATENT DOCUMENTS

| | | | | |
|---|---|---|---|---|
| 4,128,771 | A | 12/1978 | Domenico | 307/52 |
| 4,151,611 | A | 4/1979 | Sugawara et al. | 365/227 |
| 4,204,249 | A | 5/1980 | Dye et al. | 364/200 |
| 4,293,927 | A | 10/1981 | Hoshii | 364/900 |
| 4,317,180 | A | 2/1982 | Lies | 364/707 |
| 4,317,181 | A | 2/1982 | Teza et al. | 364/707 |
| 4,365,290 | A | 12/1982 | Nelms et al. | 364/200 |
| 4,381,552 | A | 4/1983 | Nocilini et al. | 364/900 |
| 4,409,665 | A | 10/1983 | Tubbs | 364/707 |
| 4,422,163 | A | 12/1983 | Oldenkamp | 365/229 |
| 4,611,289 | A | 9/1986 | Coppola | 364/492 |
| 4,615,005 | A | 9/1986 | Maejima et al. | 364/200 |
| 4,665,536 | A | 5/1987 | Kim | 377/16 |
| 4,698,748 | A | 10/1987 | Juzswik et al. | 364/200 |
| 4,716,463 | A | 12/1987 | Stacy et al. | 358/190 |
| 4,747,041 | A | 5/1988 | Engel et al. | 364/200 |
| 4,758,945 | A | 7/1988 | Remedi | 364/200 |
| 4,780,843 | A | 10/1988 | Tietjen | 364/900 |
| 4,809,163 | A | 2/1989 | Hirosawa et al. | 364/200 |
| 4,823,292 | A | 4/1989 | Hillion | 364/707 |
| 4,843,592 | A | 6/1989 | Tsuaki et al. | 364/900 |
| 4,851,987 | A | 7/1989 | Day | 364/200 |
| 4,907,150 | A | 3/1990 | Arroyo et al. | 364/200 |
| 4,951,309 | A | 8/1990 | Gross et al. | 379/98 |
| 4,980,836 | A | 12/1990 | Carter et al. | 364/483 |
| 5,025,387 | A | 6/1991 | Frane | 364/493 |
| 5,041,964 | A | 8/1991 | Cole et al. | 364/200 |
| 5,083,266 | A | 1/1992 | Watanabe | 395/275 |
| 5,142,684 | A | 8/1992 | Perry et al. | 395/750 |
| 5,167,024 | A | 11/1992 | Smith et al. | 395/375 |
| 5,218,704 | A | 6/1993 | Watts, Jr. et al. | 395/750 |
| 5,241,680 | A | 8/1993 | Cole et al. | 395/750 |
| 5,307,285 | A | 4/1994 | Storandt et al. | 364/489 |
| 5,345,347 | A | 9/1994 | Hopkins et al. | 360/71 |
| 5,355,503 | A | 10/1994 | Soffel et al. | 395/750 |
| 5,396,635 | A | 3/1995 | Fung | 39/800 |
| 5,404,546 | A | 4/1995 | Stewart | 395/750 |
| 5,410,590 | A | 4/1995 | Blood et al. | 379/147 |
| 5,423,045 | A | 6/1995 | Kannan et al. | 395/750 |
| 5,428,252 | A | 6/1995 | Walker et al. | 307/64 |
| 5,454,114 | A | 9/1995 | Yach et al. | 395/750 |
| 5,481,730 | A | 1/1996 | Brown et al. | 395/750 |
| 5,504,907 | A | 4/1996 | Stewart et al. | 395/750 |
| 5,511,205 | A | 4/1996 | Kannan et al. | 395/750 |
| 5,546,590 | A | 8/1996 | Pierce | 395/750 |
| 5,606,704 | A | 2/1997 | Pierce et al. | 395/750 |
| 5,805,909 | A | 9/1998 | Diewald | |
| 5,928,365 | A | * 7/1999 | Yoshida | 713/324 |
| 6,115,823 | A | * 9/2000 | Velasco et al. | 713/322 |
| 6,219,797 | B1 | * 4/2001 | Liu et al. | 713/500 |
| 6,401,156 | B1 | * 6/2002 | Mergard et al. | 710/266 |

FOREIGN PATENT DOCUMENTS

EP           0 708 398 A2    4/1996

* cited by examiner

Primary Examiner—Dennis M. Butler
(74) Attorney, Agent, or Firm—Fish & Richardson P.C.

(57) ABSTRACT

A power management system for a microcontroller. The power management system includes a power management state machine for controlling a power mode of a central processing unit (CPU) and each subsystem within the microcontroller. Each microcontroller subsystem is connected to the system through a configurable peripheral interface (FPI). Each FPI includes a software configuration register (SFR) that can be configured by an operating system or application program. The SFR for the various FPIs can be preconfigured to allow the response to each of the power modes of the power management state machine to be independently controlled for each subsystem.

24 Claims, 4 Drawing Sheets

POWER MANAGEMENT AND CONTROL FOR A MICROCONTROLLER

BACKGROUND OF THE INVENTION

1. Field of the Invention

The present invention relates to a power management system for a microcontroller that provides decentralized power management of the microcontroller subsystems while providing a modular architecture that can be used for microcontrollers having different numbers of subsystems and more particularly to a modular power management architecture for a microcontroller which includes a power management state machine for controlling the power modes of the various microcontroller subsystems as well as a programmable peripheral interface for each of the subsystems which allows the response of the various subsystems to the various power modes to be preconfigured, thereby providing optimal power management of the subsystems.

2. Description of the Related Art

Various microcontrollers are used in numerous portable battery powered devices, such as portable personal computers and cellular phones. An important concern in any portable battery powered device is extending the amount of time the device can be used before the battery requires recharging. It is known to provide power management of the various subsystems within such portable devices in order to conserve battery power. Computer systems, for example, as disclosed in U.S. Pat. No. 4,980,836, utilize centralized power management control of various peripheral devices, such as the floppy disk drive and hard disk drive in order to conserve battery power. More particularly, in the system disclosed in the '836 patent, accesses to the various peripheral devices, such as the floppy disk drive and the hard disk drive are monitored. If the peripheral devices have not been accessed for a predetermined amount of time, the computer system including the peripherals are placed in a low power state by way the centralized power management control logic. In such a low power state, the system clock frequency may be either stopped or reduced in order to reduce the power consumption of the device. By stopping the system clock, the power consumption is significantly reduced since CMOS devices, typically used in such applications, utilize extremely low power at zero frequency. Other known computer power management systems are disclosed in U.S. Pat. Nos. 4,611,289; 4,041,964; 5,218,704; 5,396,635; and 5,504,907.

The drawbacks of centralized power management control for peripheral devices are recognized by peripheral device manufacturers. In particular, it is recognized that the power management of a particular peripheral for a computer system may be best optimized at the peripheral device itself. Thus, various peripheral manufacturers have developed decentralized power management systems for various peripheral devices in order to optimize battery power conservation. For example, U.S. Pat. No. 4,151,611 discloses a power management system for memory systems. U.S. Pat. No. 4,951,309 discloses a power management system for a modem. U.S. Pat. No. 5,345,347 discloses a power management system for a disk drive. U.S. Pat. Nos. 5,546,590 and 5,606,704 disclose power management system for PC MCIA cards.

As mentioned above, microcontrollers are used in various applications for portable devices, such as cellular phones and automotive systems. In all such applications, there is an ever increasing trend to reduce the size of the device. For example, in newer cellular phone systems, unlike the "bag" phones in which the battery is carried in a bag separate from the phone, the newer portable cellular telephone include an integral battery and are becoming smaller and smaller. As such, reduction of the size of the cellular phone typically results in a reduction of the battery size. In general, for a given battery chemistry, for example, nickel cadmium or nickel metal hydride, reducing the size of the battery results in a reduced battery capacity. As such, reduced cellular phone size and increased battery capacity have become competing design tradeoffs in such devices. In order to optimize the tradeoff, power management techniques, utilized on a system level, for example, for computer systems, as discussed above, have been implemented on a microcontroller level in order to minimize battery power consumption. In general, power management techniques at the microcontroller level are known to utilize centralized control to control the power to the central processing unit (CPU) by reducing the speed or stopping the system clock.

There are several disadvantages in utilizing such centralized control at the microcontroller level. First, such centralized systems do not optimize the power usage of the various subsystems of the microcontroller. In general, the microcontroller subsystems are treated equally with the CPU from a power management standpoint and are thus not optimized. Secondly, the architecture of the power management system in known microcontrollers varies as a function of the number of subsystems included in the microcontroller for a given microcontroller family. For example, lower cost microcontrollers are normally provided without analog and digital converters (ADC) and corresponding ADC ports requiring one power management architecture, while higher level microcontrollers within the same family may include an ADC as well as other subsystems which require a different power management architecture. Thus, for a given family of microcontrollers, multiple power management architectures may be required, which increases the cost and complexity of the microcontrollers.

SUMMARY OF THE INVENTION

It is an object of the present invention to solve various problems in the prior art.

It is yet a further object of the present invention to provide a power management system for a microcontroller which enables the microcontroller subsystems to be independently controlled.

It is yet a further object of the present invention to provide a modular architecture for a power management system for a microcontroller which enables the power management of the microcontroller subsystems to be controlled independently of the central processing unit (CPU).

Briefly, the present invention relates to a power management architecture for a microcontroller. The power management architecture includes a power management state machine for controlling the power mode of the central processing unit (CPU) and each of the subsystems within the microcontroller. The power management state machine includes a software configurable register (SFR) to enable the state machine to be configured for device and application specific applications. Each of the microcontroller subsystems is connected to the system by way of a flexible peripheral interface (FPI)(the system bus). The FPI is a 32 bit de-multiplexed, pipelined bus. Each FPI device includes a software configuration register, special function register (SFR) which can be configured by an operating system or application program. The SFR for the various FPI devices enables the response to each of the power modes of each microcontroller subsystem to be pre-configured; thus enabling each subsystem to be independently controlled by the power management state machine in order to optimize the power management of the various subsystems. Each of the FPI interfaces as well as the power management state SFR are connected to an FPI bus which interconnects the FPI interfaces with the central processing unit (CPU) and power management state machine SFR. The FPI bus enables reads and writes of the power management state machine SFR and peripheral interface SFRs. Such a configuration allows subsystems to be added or deleted without changing the basic architecture of the power management system, thus forming a modular power management architecture which reduces the cost and complexity of the microcontrollers.

BRIEF DESCRIPTION OF THE DRAWING

These and other objects of the present invention are readily understood with reference to the following specification and attached drawings.

DETAILED DESCRIPTION OF THE INVENTION

Figure 1:
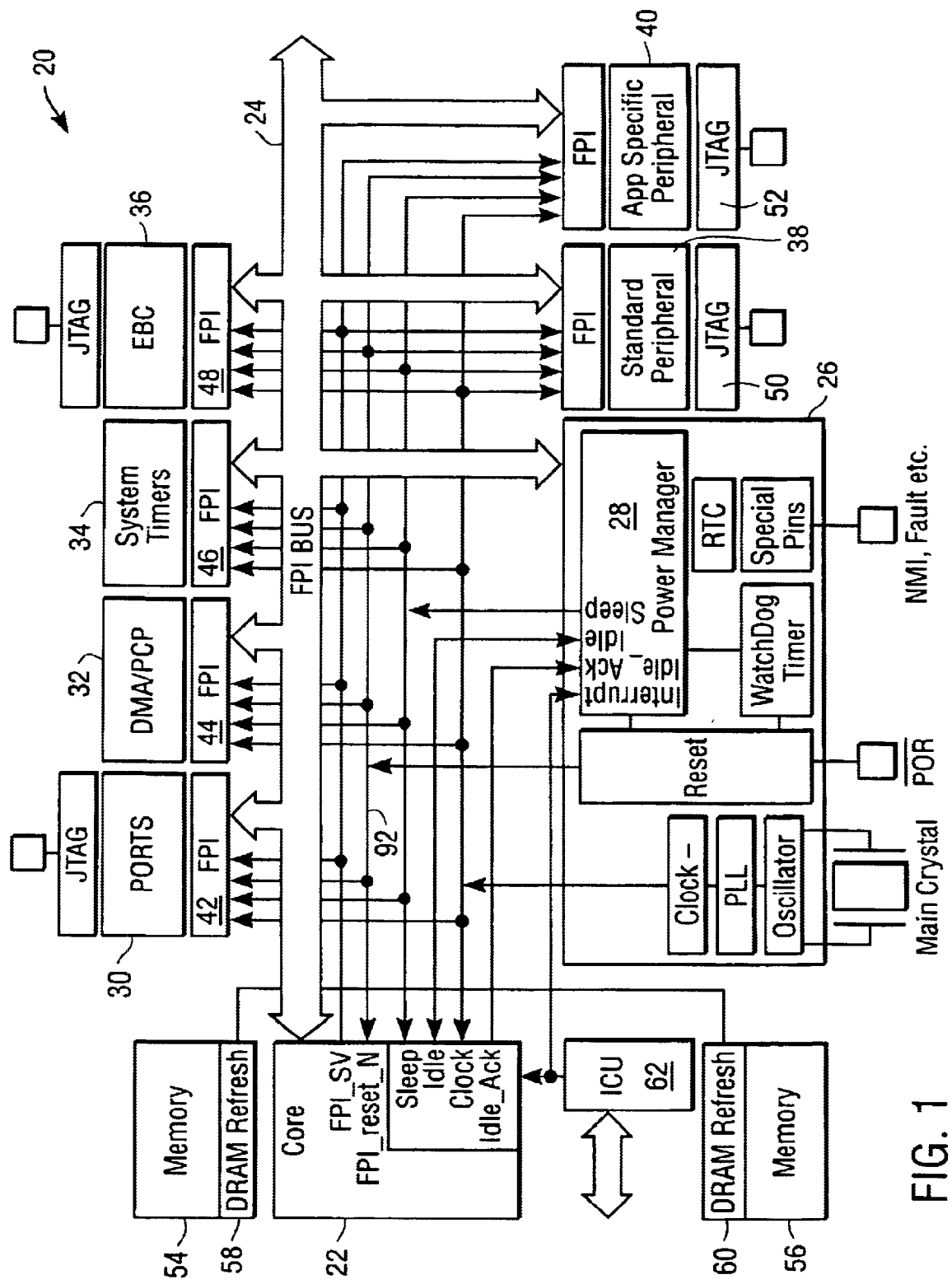
FIG. 1 is a block diagram of a power management architecture for a microcontroller or system on chip (SoC) in accordance with the present invention, shown with only those subsystems necessary for a complete understanding of the invention for clarity.

The present invention relates to a modular power management architecture for a microcontroller or System on Chip (SoC) which can be utilized for microcontrollers or SoC's with different numbers of subsystems and which allows an operating system or application program to independently control the subsystems within the microcontroller to optimize power management of the subsystems. In particular, the microcontroller architecture includes a power management subsystem which includes a configurable power management state machine for controlling the power modes of the central processing unit (CPU) and the various microcontroller subsystems. Each microcontroller subsystem is interconnected to the power management subsystem and the CPU by way of a flexible peripheral interface (FPI) and an FPI bus. The power management state machine and the FPI devices each contain a special function register SFR. The power management state machine SFR allows the power management subsystem to be configured for specific applications. The FPI SFRs enable the response of the peripheral to the various power modes of the power management subsystem to be pre-configured by the operating system or application program to provide increased flexibility and optimal power management of the subsystems. Such an architecture allows the power management subsystem to control the various subsystems from a power management standpoint with a few global commands. The use of the FPI bus and FPI peripheral interfaces for each of the subsystems provides for a modular architecture which can be used with virtually any number of subsystems; thus decreasing the complexity and the cost of the microcontrollers. As such, such systems can be added to the microcontroller without the need to design an entirely new integrated circuit. In addition, it should be understood that the modular architecture in accordance with the present invention can be used in applications other than power management to provide optimal control of the microcontroller subsystems. It is noted that, the term "microcontroller" is deemed interchangeable with any System-on-Chip (SoC).

As will be discussed in more detail below, the power management subsystem in accordance with the present invention may provide up to four power modes or states: RUN; IDLE; SLEEP; and DEEP SLEEP. Each of these power modes may be optimized through software by way of the SFR registers located in the FPI peripheral interfaces for each of the subsystems for more or less power consumption depending on the instantaneous requirements of the particular subsystem. The IDLE mode affects only the CPU core. The SLEEP and DEEP SLEEP modes affect the complete device and can help control power modes of external devices as well. Each of these modes is discussed in more detail below.

As discussed above, the response of each of the subsystems in the states can be preconfigured by the operating system or application program to provide optimum subsystem performance. These states or modes can be used to allow for gradual reduction of power consumption by reduction of the clock speed for any one of the subsystems; stop or complete subsystem power down as well as overall system stop and power down. In all of the modes or states, the power management system continues to operate so that it can wake the subsystems on command. As such, the microcontroller with the power management architecture in accordance with the present invention is able to provide increased battery life for portable microcontrolled devices, such as cellular phones, as well as power loss in a recoverable fashion. In addition, the system can be used to limit peak power during turn-on and reset of the portable device which can cause battery power fault condition, resulting in shut down of the device. During such conditions, the power, oscillator and phase lock loop (PLL) functions may be ramped in order to lower the peak power ($Icc_{MAX}$) and startup surge which allows a more efficient low-power power supply to be used thus lowering the cost while dramatically lowering the average power $Icc_{TYP}$ of the microcontroller. Other advantages of the system in accordance with the present invention include: the ability of the system to maintain its state without data loss during battery discharge conditions such that, for example, the system can enter a static mode at the first sign of a power failure, the power supply can maintain regulation, and the device's state is maintained until a new battery is inserted or recharged; the ability to shut off entire subsystems during the SLEEP mode in order to minimize power supply losses at low power; and a soft RESET that does not disturb external devices or memory, which allows reset of only those components of the system which were powered down, leaving the external system unaware of the reset. fashion. In addition, the system can be used to limit peak power during turn-on and reset of the portable device which can cause battery power fault condition, resulting in shut down of the device. During such conditions, the power, oscillator and phase lock loop (PLL) functions may be ramped in order to lower the peak power ($Icc_{MAX}$) and startup surge which allows a more efficient low-power power supply to be used thus lowering the cost while dramatically lowering the average power $Icc_{TYP}$ of the microcontroller. Other advantages of the system in accordance with the present invention include: the ability of the system to maintain its state without data loss during battery discharge conditions such that, for example, the system can enter a static mode at the first sign of a power failure, the power supply can maintain regulation, and the device's state is maintained until a new battery is inserted or recharged; the ability to shut off entire subsystems during the SLEEP mode in order to minimize power supply losses at low power; and a soft RESET that does not disturb external devices or memory, which allows reset of only those components of the system which were powered down, leaving the external system unaware of the reset.

SYSTEM BLOCK DIAGRAMS

A block diagram for the microcontroller power management architecture in accordance with the present invention is illustrated in FIG. 1 and generally identified with the reference numeral 20. The power management architecture can be implemented on virtually any microcontroller. For clarity, only those elements and subsystems of the microcontroller necessary for a complete understanding of the invention are shown. As shown, the microcontroller includes a CPU core 22, which may be any of a variety of CPU cores, such as a 32-bit RISC-like core, a digital signal processor core, or a 16-bit microcontroller core. The CPU core 22 is coupled to a system bus, for example, a multiplexed address/data FPI bus 24, for example, 32 bit, to enable the operating system or application program to read and write the SFR register in the power management state machine as well as the SFRs in each of the FPI peripheral interfaces for each of the subsystems. A management subsystem 26 is also provided and coupled to the FPI bus. The management subsystem 26 includes a power manager 28 which controls the power modes of the CPU core 22 as well as other subsystems to be controlled as will be discussed in more detail below. Also attached to the FPI bus 24 are various microcontroller subsystems including input/output (I/O) ports 30, direct memory access (DMA) 32, system timers 34, and external bus controller (EBC) 36. Other standard subsystems are identified with the reference numeral 38, while applications specific subsystems are identified with the reference numeral 40. Each of the major subsystems 30–40 are connected to the FPI bus 24 by way of a FPI peripheral interface 42–52, respectively. The microcontroller may also include memory banks 54 and 56, which may be dynamic random access memory (DRAM) and include refresh circuitry 58 and 60, respectively. As will be discussed in more detail below, an interrupt control unit (ICU) 62 is kept active (i.e. powered up) during all power modes. An Interrupt control signal from the ICU 62 is tied to both the power management subsystem 28 as well as the CPU core 22.

Figure 2:
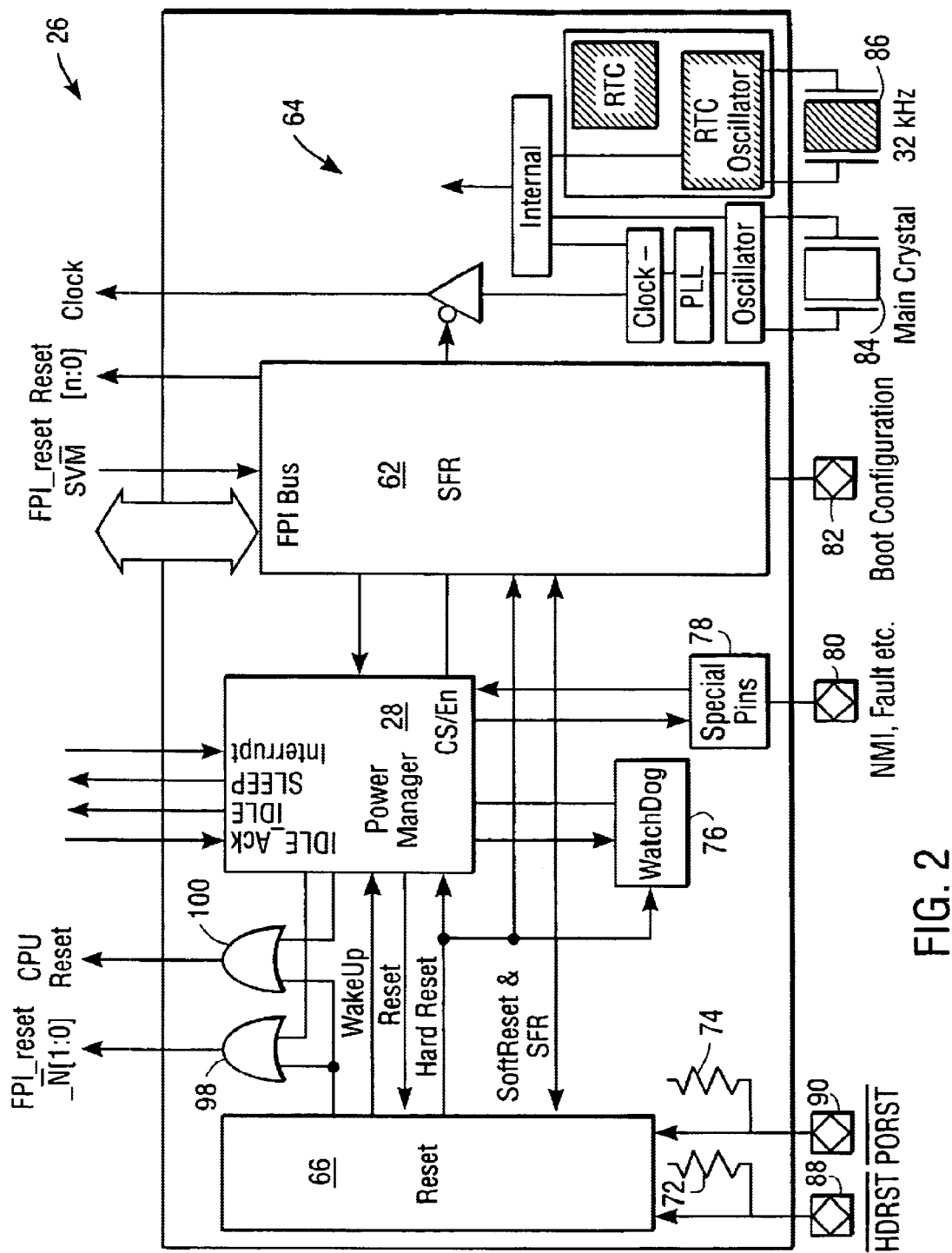
FIG. 2 is an expanded block diagram of the power management subsystem of the microcontroller illustrated in FIG. 1.

An expanded block diagram of the management subsystem 26 is illustrated in FIG. 2. As shown, the power management subsystem 26 includes the power manager 28 which includes a power management state machine, a programmable special function register (SFR) 62, a clock subsystem 64 for generating a system clock signal CLOCK and a reset subsystem 66. The reset subsystem 66 may be a conventional reset circuit which is responsive to an external hardware reset HDRST! 68 and a power on reset PORST! 70. (As used herein the symbol ! is used to designate a logical complement of a signal or in other words that the signal is active low.) The reset PORST! 70 resets the complete chip; the complete system is held in reset until the PLL 85 indicates a lock to an external crystal. The reset HDRST! is constantly sampled by the power manager 28 at the power clock frequency to detect the external hardware reset request. The power manager 28 will reset the chip and hold it in reset until it detects an inactive HRDST!. Each of these resets HDRST! and PORST! may be pulled up by pull up resistors 72 and 74, respectively. The management subsystem 26 may also include a watchdog timer 76 as well as the ability for external signals, such as non-maskable interrupt (NMI) and battery fault, identified as special pins with the reference numeral 78, shown connected to an external pin 80 to interface with the power system state machine 28. According to one embodiment, the FPI bus is a demultiplexed 32-bit address/data bus. It is noted, however, that any system bus could be employed. Thus, the figures are exemplary only.

SYSTEM I/O PINS

Table 1 illustrates the dedicated I/O pins for the power management subsystem 26. The pins for main crystal, identified with the reference numeral 84, provide the main clock source. The pins for the 32 KHz crystal, identified with the reference numeral 86, are optional and are used for those microcontrollers which include a real time clock (RTC). The hard reset HDRST! and power on PORST! reset pins 88 and 90 are used in conjunction with the reset subsystem 66. As discussed above, special interrupt pins, generally identified with the reference numeral 78, enable the management subsystem 26 to interface with external interrupts, such as a non-maskable interrupt (NMI) and a battery power fault. The management subsystem 26 may also be provided with output pins, identified in FIG. 2 as boot configuration pins 82, for core power enable and sleep. These pins are discussed in Table 1 and are configured during boot up and read from the SFR register to control external devices.

TABLE 1

| Signal | I/O | Optional | When Unused | Function |
|---|---|---|---|---|
| Main Crystal | I/O | | | Main Oscillator Source |
| PORST! | Input | | | Power on Reset Pin |
| HDRST! | I/O | | | External Hard Reset |
| Power Fault | Input | Yes | Negated | Pending Battery or Power Fault (Signal must go to ICU as well) |
| NMI | Input | Yes | Negated | Non-Maskable Interrupt (Signal must go to ICU as well) |
| Core Power Enable | Output | Yes | — | Asserted = Supply Power to Device Core, Negated = Remove Core Power |
| Sleep | Output | Yes | — | Assert SLEEP signal to external devices |
| 32 KHz Crystal | I/O | Yes | — | 32 KHz oscillator Source |

SYSTEM CONTROL SIGNALS

Table 2 is a list of the signals generated by the power management subsystem 26 used in the overall power management system. These signals are discussed below.

TABLE 2

| SIGNAL | SOURCE | FUNCTION |
|---|---|---|
| FPI RESET_N [1:0] | Management subsystem 26 | Hard reset to all FPI subsystems |
| RESET [n:0] | Management subsystem 26 | software reset to individual subsystems |
| CPU RESET | Management subsystem 26 | reset CPU core |
| SYSTEM CLOCK | Management subsystem 26 | Full system clock (distribution) |
| IDLE | Management subsystem 26 | asserting during IDLE mode to CPU |
| IDLE Ack | CPU 22 | asserting when pipe line is flushed |
| SLEEP | Management subsystem 26 | asserting during SLEEP mode to system |
| FPI_SVN | Bus masters (Debug included) | CPU supervisory mode instruction. |

The FPI_SVN signal is a supervisory signal that is asserted by a bus master (i.e. CPU core). More particularly, as mentioned above, each of the subsystems 30–40 include a FPI peripheral interface 42–52, respectively, which, in turn, include an SFR register which enables the individual subsystems 30–40 to be configured by the operating system on how to respond to the power management commands from the power manager 28. The management subsystem 26 also includes an SFR register 62 that allows the management subsystem to be configured during boot up by way the operating system for a specific application. The signal FPI_SVN is asserted during a supervisory mode to enable the SFRs to be configured.

Figure 6:
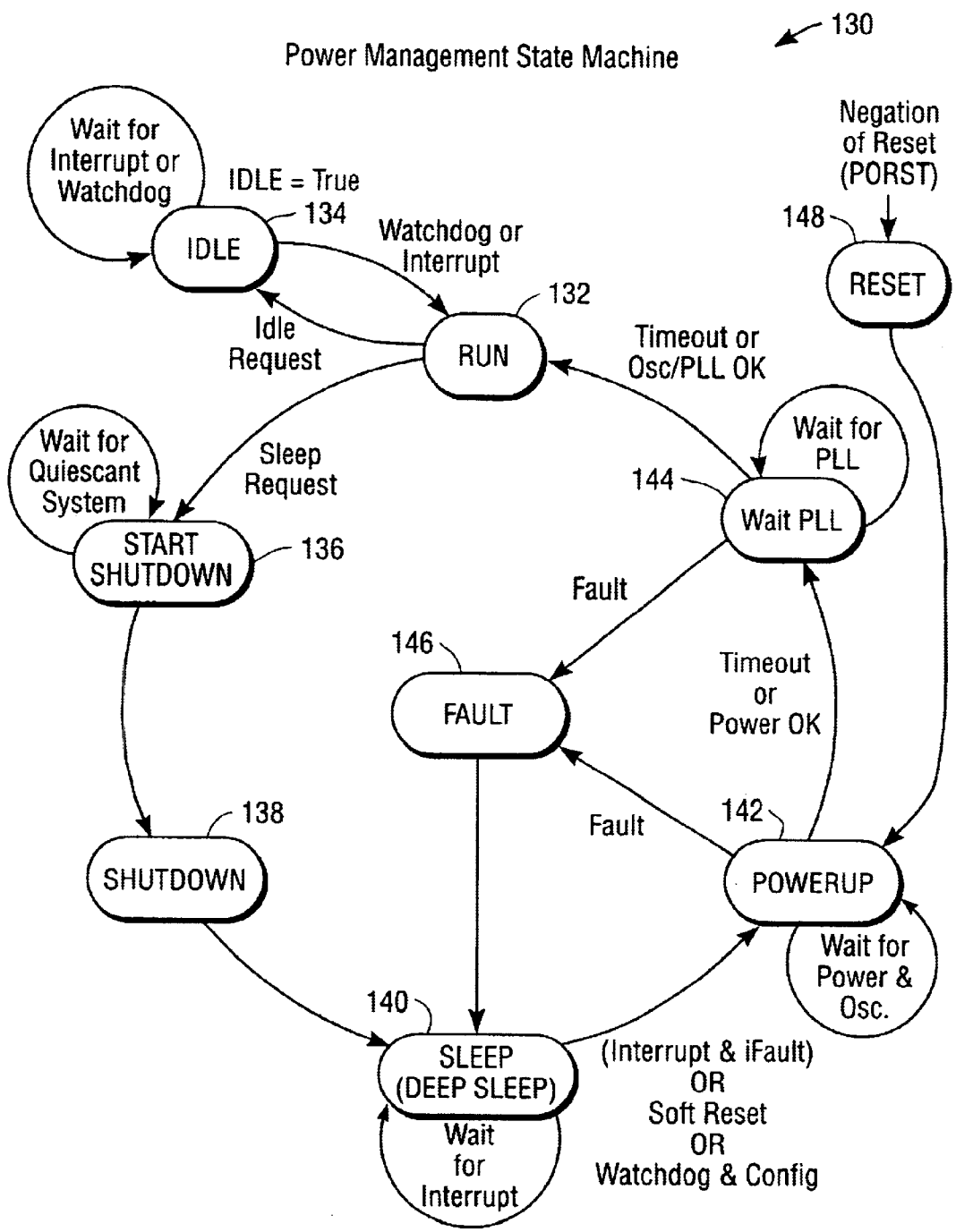
FIG. 6 is a state diagram for the state machine according to an embodiment of the present invention.

The reset signal [n:0] RESET is used for resetting the individual subsystems 30–40. One bit per subsystem is provided to enable individual software reset control of each of the subsystems independent of the other systems. The software reset signal RESET [n:0] is connected to a reset bus 92 as well as a hardware reset signal FPI_RESET_N [1:0]. The reset bus 92, is an n bit bus, for example, a 8 bit bus. One bit is connected to each of the major subsystems 30–40. For example, the Reset on Wake Up bit of the state machine SFR is used to configure the software reset signal for a global reset when persistent memories are not possible. In addition to the software reset signal, RESET [n:0], a hard reset signal FPI_RESET_N [1:0] is also applied to each of the major subsystems 30–40 by way of the reset bus 92 to provide a hardware reset to all subsystems 30–40. The hard reset signal FPI_RESET_N [1:0] is available at the output of the OR gate 98 and generated by various sources as indicated in Table 3 below including the power management state machine. The power management state machine generates this signal, for example, as the output of various states, as seen in FIG. 6 and is explained in greater detail below. In particular, this signal may be an output from states SLEEP 140, POWER UP 142, Wait PLL 144, and RESET 148.

Various software entities may request a reset by writing to the SFR 62. The Reset Unit reset unit 66 reads the soft reset signal and issues a reset control signal to the OR gates 98, 100.

The power management state machine 28 can also generate a CPU reset by way of a CPU reset signal, available at the output of an OR gate 100. from the reset unit 66.

Several signals can be used to reset the complete system or individual subsystems 30–40 including: a power on reset PORST!; a hardware reset HDRST!; a watchdog timer reset; and a wakeup reset from a SLEEP mode. Table 3 indicates the reset sources and the results.

TABLE 3

RESET RESULTS

| Reset Source | FPI_Reset_n (1:0) | HDRST! Out | CPU Reset | Memory Reset | PLL Reset | Boot Config | Debug | Manager Block |
|---|---|---|---|---|---|---|---|---|
| PORST! | 00 | X | X | X | X | X | X | X |
| HDRST! | 00 | X | X | X | X |  | X | X |
| Watchdog | 00 | X | X | X | X |  | X | X |
| PMSM | 00 |  | X | X | X |  |  |  |
| Soft Reset RSTREQ | RS FPI | RS OUT | X | selectable | RS CLK |  | RS DBG |  |

As illustrated in Table 2, the management subsystem 26 also generates a system clock signal, an IDLE signal, and a SLEEP signal. The IDLE signal is asserted by the power management state machine only to the CPU core 22 to hold its internal clocks. More particularly, when the IDLE signal is asserted, the CPU flushes its pipeline and shuts down its internal clocks until the IDLE signal is removed. The IDLE signal is asserted in the IDLE, SLEEP and DEEP SLEEP modes. Once the IDLE signal is asserted, the CPU core 22 asserts the IDLE acknowledge signal when the pipeline is flushed and halts or disables the internal CPU clock. During the time the IDLE time is asserted, all interrupts from the interrupt controller unit 62 are ignored. The SLEEP signal is an assertion from a power management state machine to all subsystems to switch to their respective SLEEP mode configurations as will be discussed in more detail below.

CLOCK SUBSYSTEM

Figure 3:
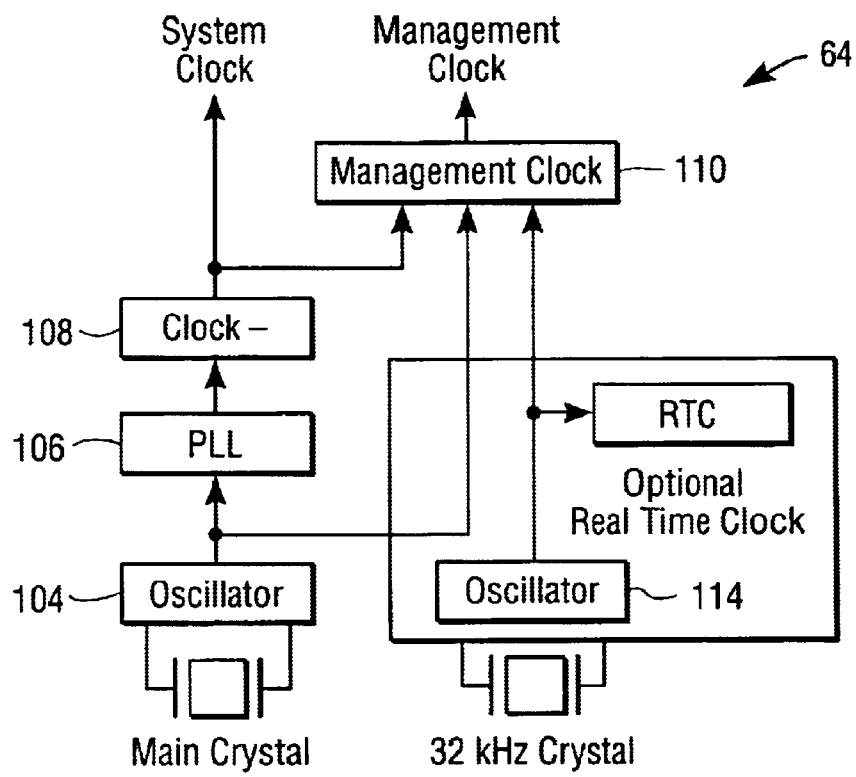
FIG. 3 is a block diagram of the clock subsystem in accordance with present invention which forms a part of the invention.

The clock subsystem 64 is used to generate a system clock signal as well as a management clock signal. An exemplary clock subsystem 64 is illustrated in FIG. 3 and includes: a system oscillator 104; a phase lock loop (PLL) 106; and a clock 108, which are used to generate a system clock signal SYSTEM CLOCK. The main crystal 84 (FIG. 2), for example, 15 MHz, depending on the clock speed of the CPU core 22, is connected to the system oscillator 104 to generate an oscillation frequency of 150 MHz. The PLL 106 locks in the oscillation frequency, while the clock circuit 108 divides the oscillation frequency to provide the system clock frequency, for example 75 MHz.

The clock subsystem 64 also includes a management clock 110. The management clock 110 can be derived from one of three sources such as a real time clock (RTC)

oscillator 114, connected to the 32 KHz crystal 86; the system clock oscillator 104; or the system clock signal SYSTEM CLOCK. A known multiplexer may be used to switch between the clock sources. The clock subsystem 64 may be configured by the SFR register 62 within management subsystem 26. Depending on the configuration of the SFR register 62, the system clock signal may be generated by the main oscillator 84/PLL 86 or shut down. The management clock is used to run the power management system, a reset clock, and the watchdog timer.

During normal operations, the management clock may be sourced by the system clock signal SYSTEM CLOCK. During low power operation, START-UP and DEEP SLEEP mode of operation, the management clock 110 may be driven by the main oscillator 104. Alternatively, if a 32 KHz oscillator is used for the real time clock, the management clock signal can be generated from the 32 KHz source while the main oscillator remains shut off.

SOFTWARE CONFIGURATION REGISTERS (SFR)

Figure 4:
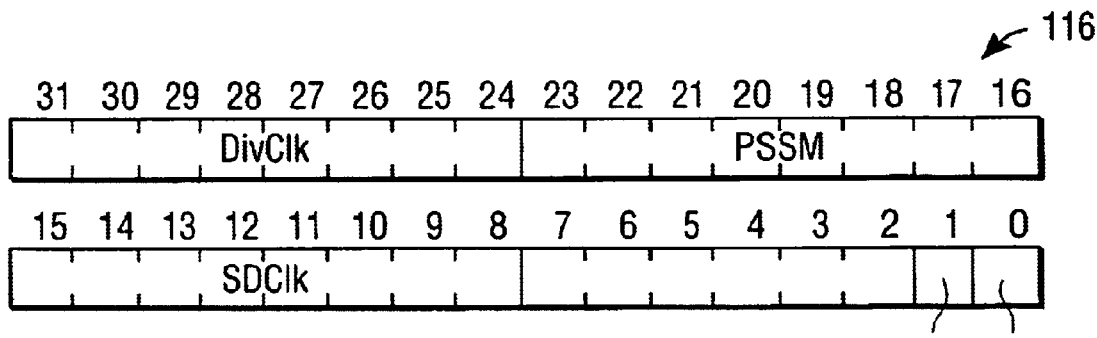
FIG. 4 is a bit diagram of a peripheral interface power control special function register (SFR) in accordance with the present invention.

Software configuration registers (SFR) are provided in each of the subsystems to 30–40 in order to control the response of each subsystem 30–40 during the different power modes of operation. In particular, each subsystem 30–40 is provided with a peripheral interface power control SFR register 116 as illustrated in FIG. 4. The register 116 may be a 32 bit register as shown with bit definitions as indicated in Table 4 below:

TABLE 4

| Name | Bits | Value | R/W | Req/ O/Rec | Purpose |
|---|---|---|---|---|---|
| SME (Sleep Mode Enable) | 0 | 0<br>1 | r/w | Required | No SLEEP Mode (Default) Enable SLEEP Mode when "SLEEP" signal assert |
| DPC (Disable Peripheral Clock) | 1 | 0<br>1 | r/w | Required | Disable Peripheral during RUN Mode (Default) RUN, Clock enabled |
| SDClk (Sleep Divide Clock) | 15:8 | 0000000 0<br>0000000 1:<br>1111111 1 | r/w | Optional | Disable During SLEEP (Default) Divided Clock During SLEEP as defined by Peripheral |

These peripheral interface power control SFR registers 116 allow the operating system to control each of the subsystems 116 independently. Subsystems 30–40 that are not used may be either powered down or have their clock forced into a static state. As mentioned above, the peripheral interface power control SFR register 116 is only accessible in the supervisory mode of the CPU core 22 or other privileged modes. These registers 116 may be reset to a default value when the reset signal FPI RESET_N [1:0]=00 or 01 or during a soft reset.

As noted from Table 4, the register 116 includes a SLEEP mode enable bit SME, which allows the subsystem 30–40 either to ignore the SLEEP mode or enable the sleep mode when the SLEEP signal is asserted by the power management state machine. A disable peripheral clock (DPC) bit allows the subsystem or peripheral to either be disabled during a RUN mode or enabled. A sleep divide clock (SDCLK) bit and a divide clock (DIVCLK) bit either disables or provides divided clock signals to the subsystem during a SLEEP mode and also may provide a divided clock signal to the subsystem during a normal mode. The peripheral interface control SFR register 116 may also provide for a peripheral specific configuration of a peripheral specific sleep mode which would be active when the sleep mode enable signal SME is set.

Figure 5:
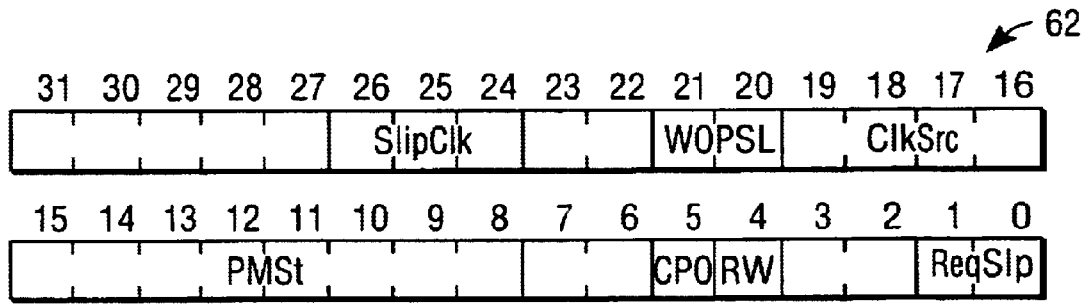
FIG. 5 is a bit diagram of an SFR for a power management state machine in accordance with the present invention.

As mentioned above, the power management state machine also includes an SFR register 62 which allows the power management system to be configured for specific applications. The register 62 is illustrated in FIG. 5. A definition of the bits in the register 62 is provided in table 5 below.

TABLE 5

| NAME | BITS | VAL-UE | R/W | REQ/O/REC | PURPOSE |
|---|---|---|---|---|---|
| ReqSlp (Request Sleep) | 1:0 | 00 | r/w | Required | No Sleep Request (Default) Idle Request Sleep Request Deep Sleep Request (DEEP SLEEP bit)[a] Note: this field is cleared upon return to RUN state |
| RW (Reset on Wake-Up) | 4 | 0<br>1 | r/w | Required | No Reset on Wake Up(Default) Reset on Wake Up[b] |
| CPO (Core Power Off) | 5 | 0<br>1 | r/w | Optional | Core Powered during DEEP SLEEP (Default) Core Powered Off in DEEP SLEEP |
| PMSt (Power Management State) | 15:8 | | r | Required | As defined in the implementation |
| ClkSrc (Clock Source during Sleep) | 19:16 | 0000<br>0010<br>0011<br>0100<br>0101<br>1000<br>1010<br>1011<br>1100<br>1101<br>all others | r/w | Required<br>Recommended<br>Recommended<br>Optional<br>Optional<br>Required<br>Recommended<br>Recommended<br>Optional<br>Optional | Normal PLL (Default) Oscillator Pass Through/PLL on Oscillator Pass Through/PLL off 32 KHz/Osc & PLL on 32 KHz/Osc & PLL off Normal PLL/No Sys Clk Oscillator Pass Through/PLL on/No Sys Clk Oscillator Pass Through/PLL off/No Sys Clk 32 KHz/Osc & PLL on/No Sys Clk 32 KHz/Osc & PLL off/No Sys Clk Reserved |
| WOPSL (Watch dog Operation in Sleep) | 21:20 | 00<br><br>01<br><br>10<br><br>11 | r/w | Recommended | Watchdog operates during Sleep and Idle and overflow can cause reset (Default) Watchdog operates during Sleep and Idle and causes wake-up Watchdog Timer clock stopped during Sleep. Note: The Watchdog timer will be unable to cause a reset or wake up from Sleep in this mode. Reserved |

TABLE 5-continued

| NAME | BITS | VAL-UE | R/W | REQ/O/REC | PURPOSE |
|---|---|---|---|---|---|
| SlpClk (Sleep Clock) | 26:24 | 000 | r/w | Recommended | No Division of System Clock during Sleep (Default) |
| | | 001 | | | Divide System Clock by 2 during Sleep |
| | | 010 to 111 | | | Divide System Clock by 4 during Sleep Divide System Clock by 128 during Sleep |

Referring to Table 5, a request sleep signal REQSLP allows the power management state machine to be configured for different reduced power modes of operation; IDLE, SLEEP and DEEP SLEEP. Alternatively, the request sleep signal REQSLP can be set to 00 which disables the power management function altogether (a nominal configuration until some managed state is desired). A reset on wakeup signal RW is used to configure the reset state on wakeup. A core power off signal CPO is used to define whether the CPU core 22 is powered in the DEEP SLEEP mode. The state of power management state machine signal PMST are read only bits and enables the power management state to be read by the system for debug and development. A clock source signal CLKSRC enables the clock source to be configured for different power states. A watchdog operation in sleep mode (WOPSL) signal defines the operation of the watchdog timer during SLEEP and IDLE modes. A sleep clock signal SLPCLK is used to program the frequency of the system clock during a sleep mode of operation.

Table 6 illustrates the resulting actions from the watchdog timer in alternative states.

TABLE 6

| Watchdog Overflow State | WOPSL! = 01 | WOPSL = 01 |
|---|---|---|
| RUN | Cause System Reset | Force System Reset |
| IDLE | Cause System Reset | Transition to RUN |
| SLEEP | Cause System Reset | Wake-up |
| POWER UP | Cause System Reset | Continue Wake-up |

TABLE 6-continued

| Watchdog Overflow State | WOPSL! = 01 | WOPSL = 01 |
|---|---|---|
| OSC/PLL | Cause System Reset | Continue Wake-up |
| All Others | Cause System Reset | Ignore |

The clock source as set by the system clock bits CLKSRC is illustrated in Table 7:

TABLE 7

| State | Deep Sleep | ClkSrc | Sip-Clk | Management Clock Source | System Clock Source |
|---|---|---|---|---|---|
| RUN | — | — | — | Divided PLL Output | Divided PLL Output |
| IDLE | — | — | — | Divided PLL Output | Divided PLL Output |
| START SHUTDOWN | — | — | — | Divided PLL Output | Divided PLL Output |
| SHUTDOWN/ SLEEP/POWER UP/Wait PLL/FAULT | 0 | 0000 | n | $PLL/2_n$ | $PLL/2_n$ |
| | 0 | 001X | n | $Osc/2_n$ | $Osc/2_n$ |
| | 0 | 010X* | n | $32\ KHz/2_n$ | $32\ KHz/2_n$ |
| | 0 | 1000 | n | $PLL/2_n$ | None |
| | 0 | 101X | n | $Osc/2_n$ | None |
| | 0 | 110X* | n | $32\ KHz/2_n$ | None |
| | 1 | X000 | n | $PLL/2_n$ | None |
| | 1 | X01X | n | $Osc/2_n$ | None |
| | 1 | X01X* | n | $32\ KHz/2_n$ | None |

It should be noted that if there is no 32 KHz clock/oscillator in the system, the source will default to the internal main oscillator equivalent to inverting PMSM [18:17], i.e. clock source=X10X!=X10X.

POWER MANAGEMENT MODES

The configuration of the system during the RUN, IDLE and SLEEP modes is illustrated in Table 8.

TABLE 8

| Mode | Clock | Units Powered | Units Clocked | State | Wake Up |
|---|---|---|---|---|---|
| RUN | Oscillators Pll Clock Distribution of PLL Clock | CPU Memory ICU RTC Watchdog power Management Reset Pins FPI Bus Per SFR System Timers EBC DMA Ports Peripherals | CPU Memory ICU RTC Watchdog Power Management Reset Pins FPI Bus Per SFR and Power System Timers EBC DMA Ports Peripherals | System Fully Operational | Not Applicable |
| IDLE | Oscillators PLL | CPU Memory | Memory ICU | CPU Core stopped | Any enabled |

TABLE 8-continued

| Mode | Clock | Units Powered | Units Clocked | State | Wake Up |
|---|---|---|---|---|---|
| | Clock Distribution of PLL Clock | ICU RTC Watchdog Power Management Reset Pins FPI Bus Per SFR System Timers EBC DMA Ports Peripherals | RTC Watchdog Power Management Reset Pins FPI Bus Per SFR and Power System Timers EBC DMA Ports Peripherals | Local Memory accessible to DMA and peripherals | interrupt in ICU NMI, Special Pins Reset |
| SLEEP | Oscillator Clock Distribution of PLL or Oscillator as configured in SFR | Memory ICU RTC Watchdog Power Management Reset Pins FPI Bus Per SFR System Timers EBC DMA Ports Peripherals | Memory ICU RTC Watchdog Power Management Reset Pins FPI Bus Per SFR and Power System Timers EBC DMA Ports Peripherals | CPU Core Stopped and may be unpowered. Local memory accessible to enabled devices PLL may be disabled | Any enabled interrupt in ICU NMI, Special Pins Reset |
| | No Clock Distrusted per SFRs | ICU RTC Watchdog Power management Reset Pins | ICU RTC Watchdog (per SFR) Power Management Reset | CPU Core stopped and may be unpowered. Local memory inaccessible PLL is disabled | Any enabled EXTERNAL interrupt in ICU NMI, Special Pins, Watchdog Reset |

Each of the power modes is summarized in Table 9 and described in detail below:

TABLE 9

| MODE | OPERATION |
|---|---|
| RUN | In this mode the system is fully operational. All power supply are enabled as controlled by software and all clocks and all subsystems are enabled as controlled by software. |
| IDLE | In this mode the system is semi-operation. As mentioned above, only the CPU core is affected. During this mode, the CPU core and awaiting an interrupt. The CPU core clock is disabled. This state is active entered by the operating system when no outstanding actions are pending. During this mode, all subsystems remain powered up and fully clogged. The CPU memory remains accessible to the subsystems during this mode. A watchdog reset or any enabled interim event can be used to wake the CPU. |
| SLEEP (distributed clock) | The CPU core, is IDLE. In this mode, the phase lock loop (PLL) or oscillator (OSC) clock is distributed to the subsystems which have been preconfigured to operate in the SLEEP mode. Interrupts from operating subsystems, a watchdog reset or external signal can be used to wake the system. Exact state of all of the subsystems in the device is configured by the operating system or application program prior to this state being entered. Options include clock source, operation and power modes of different subsystems. Varying this state requires a shutdown controlled by the power management systems |
| SLEEP (no distributed clock) | In this state the CPU core is IDLE and the clock is distributed only to the power management system. Exact state of this device is configured by the operating system or application program before the state is entered. Options include PLL on/off, clock source or power management system watchdog operation in power to subsystems. Entering this state requires an orderly shutdown controlled by the power management system. A watchdog overflow, external signal or enabled interrupt event can be used to wake the system. In this state, any interrupt control unit (ICU) is clocked with the power management circuitry. |
| DEEP | This state is a subset of the SLEEP mode state. |

TABLE 9-continued

| MODE | OPERATION |
| --- | --- |
| SLEEP | In this state, core power may be shut off PLL off and only one oscillator is enabled. In this state only a hard reset, non-maskable interrupt (NMI) or an external signal can be used to restart the device. Entering this state requires an orderly shutdown by the power management system. |

IDLE MODE

The IDLE mode allows the operating system or application software to stop the core CPU clocks in order to reduce power consumption. During this mode, the CPU awaits any internal or external interrupt events. When interrupt is detected, the system begins clocking immediately and execution starts where the CPU program counter was left. The interrupt is then taken. During this IDLE mode, all other on-chip clocks, PLL and devices function normally. The IDLE mode is entered when the CPU core sets the power management state machine register request sleep bit to IDLE. The power management state machine then asserts the IDLE signal to the CPU core which causes the CPU to clear its pipeline and halt while asserting an IDLE acknowledge. Three actions cause the system to switch from an IDLE mode to a RUN mode. First, any enabled interrupt can cause a transition from the IDLE mode to the RUN mode. Secondly, an assertion of a reset or watchdog timeout (if WOPSL!=01) may also cause transition form the IDLE mode to RUN mode after completing a reset operation. Third, an assertion of a watchdog timeout will cause a transition of the IDLE to RUN mode if the power management state machine bit WOPSL is set to [0:1].

SLEEP MODE (Clock Distributed)

The sleep mode (clock distributed mode) is a subset of the sleep mode and it can include sleep with clocks, no clocks and deep sleep where power may be disabled. In this mode, the PLL and oscillator are not stopped and the clock is distributed to the system. The sleep mode may be entered under program control when substantial power saving is desired and a quick response to interrupt events is required or background functionality is required. This mode allows the operating system to stop the clock for CPU 22 and selected peripheral clocks to reduce power consumption while waiting for internal or external interrupt events. This mode also allows the option of operating only those peripherals having a reduced clock frequency. When an interrupt is detected, all systems begin clocking and execution starts. During this sleep mode with clock distributed, all other on-chip clocks, PLL's and devices not explicitly stopped by program control function normally. As mentioned above, the response to the subsystems 30 through 40 to the various power modes are configured under program control. Thus, the peripheral interface control register may be set during a supervisory mode of the CPU core 22 which will enable seep ES and divide clock bits. The CPU core may configure any reduced speed through the power management state machine configuration register bits 19:16 by configuring the clock source CLKSRC bits and the sleep clock bits 26:24.

Any enabled interrupt event (except fault) to the CPU core 22 cause a transition to the sleep mode to the RUN mode. An assertion of reset will also cause the transition through the reset state to the RUN mode. If a watchdog overflow is detected, it will either cause a reset or transition to RUN mode depending on the configuration of the WOPSL and the power management state machine software configuration register 62. Alternately, the assertion of a fault condition will cause the system to transition from a sleep mode to a deep sleep/fault mode.

SLEEP MODE (Clock Not Distributed)

The sleep mode (clock not distributed) mode is entered under program control when high power saving is required and immediate response to interrupt events is not required. This mode allows the operating system or application software to stop the CPU core 22, optionally remove the CPU power and remove power and clocks from most or all of the subsystems. Also, the PLL 106 may be shutdown to minimize power consumption. The system will wait for a limited set of internal or external interrupt events to the CPU core 22. When an enabled interrupt event is detected, a powerup sequence begins. In the transition from the RUN or IDLE mode to sleep mode, the power management state machine performs an orderly shutdown of on-chip activity to CPU core to be turned off. For example, the CPU core 22, then the peripherals, and then clocks (if configured) are shut down in sequence. During a deep sleep mode, only a few functional units are powered and clocked including a clock source for the management block and ICU-special interrupt inputs and the I/O pins are powered.

The sleep mode (clock not distributed) mode is entered when the CPU core 22 sets the power management state machine software configuration register SFR 62 Request Sleep REQSLP bit to SLEEP and the clock source bits and no distribution of clock as indicated in Table 5. Any enabled interrupt, event, except a fault condition (battery or voltage), will cause a transition from a sleep mode through a wake-up sequence to a RUN mode, for examples, in response to a timer expiring or an external interrupt. The assertion of the fault mode will cause a CPU to transition from the power-up or OSC/PLL state to a deep sleep/fault mode state. The assertion of a hard reset will also force the system to perform a reset sequence which may cause loss of external and internal memory contents. On exit from the sleep mode, the CPU core 22 checks the status to identify if and why it came out of reset (i.e. cold boot, soft boot, watchdog reset or sleep mode wakeup).

DEEP SLEEP AND FAULT MODE

The DEEP SLEEP mode is entered under program control when the system must be placed on a maximum power saving mode or there has been a catastrophic failure that requires the system to shutdown completely. This mode can also be entered automatically if the power management state machine senses a fault condition as it tries to exit a sleep or deep sleep mode. Only an external hardware reset or special pins like the NMI can force the system to power on again. In order to enter the deep sleep mode, the CPU core sets the power management state machine software configuration register Request Sleep signal REQSLP to deep sleep. Alternatively, the assertion of a fault condition while the power management is in a sleep, power up or wake PLL state will cause the system to transition into a deep sleep/fault mode. Any enabled interrupt event except a fault condition (battery or voltage) to a CPU will cause the start of a wakeup process. On exiting the deep sleep mode, the CPU must check the status o identify why it came out of a PMSM SFR RW bit. These reasons include cold boot, soft boot, watchdog reset or sleep mode wakeup, deep sleep is considered a soft reset.

POWER MANAGEMENT STATE MACHINE

As mentioned above, the heart of the power management control system is a power management state machine. A state diagram for the power management state machine is illustrated in FIG. 6. As indicated in the state diagram (FIG. 6), generally identified with the reference numeral, 130, the state machine includes 8 states: a RUN state 132; an IDLE state 134; a START/SHUTDOWN state 136; a SHUTDOWN state 138; a SLEEP (DEEPSLEEP) state 140; a POWER UP state 142; a WAIT PLL state 144; a FAULT transition state 146; and a RESET state 148.

The status of each of the state variables in each of the states is provided below:

POWER STATES

In the RUN State, the following system state variables are:
Core Power=True
Oscillator=True
PLL=True
Low Speed Clocks=False
Core Reset=False
IDLE=False
Sleep=False

IDLE STATE

In the IDLE State, the following system state variables are:
Core Power=True
Oscillator=True
PLL=True
Low Speed Clocks=False
Core Reset=False
IDLE=True
Sleep=False
Wait for Interrupt, Watchdog, Reset to exit State.
On transition to Run Clear SIpReq Register field.

START SHUTDOWN STATE

In the START SHUTDOWN State, the following system state variables are:
Core Power=True
Oscillator=True
PLL=True
Low Speed Clocks=False
Core Reset=False
IDLE=True
Sleep=True

SHUTDOWN STATE

In the SHUTDOWN State, the following system state variables are:
Core Power=True
Oscillator=True
PLL=True
Core Reset=False
IDLE=True
Sleep=True
If (ClkSrc!=0000) Low Speed Clocks=True

SLEEP (DEEP SLEEP) STATE

In the SLEEP State, the following system state variables are:
IDLE=True
Sleep=True

| | |
|---|---|
| If (ClkSrc = 1XXX) | Sys Clocks = False |
| If (ClkSrc = 1XX1) | PLL = False |
| If (ClkSrc = 1101) | Oscillator = False |
| If (ClkSrc ! = 0000) | Low Speed Clocks = True |
| IF (DEEP SLEEP) | Sys Clocks = False |
| | PLL = False |
| If (CPO = 1) | Power = False |
| | Core Reset = True |

Wait for interrupt, Watchdog, Reset etc. to exit Sleep State

POWER UP STATE

In the POWER UP State, the following system state variable are
IDLE=True
Sleep=True
Power=True
Oscillator=True

| | |
|---|---|
| If (ClkSrc = 1XXX) | Sys Clocks = False |
| If (ClkSrc = 1XX1) | PLL = False |
| If (ClkSrc ! = 0000) | Low Speed Clocks = True |
| If (RW = 1) | Sys Clocks = False |
| If (DEEP SLEEP) | PLL = False |
| If (CPO = 1) | Core Reset = True |
| | Wait for (Fault ! Power OK ! Osc OK ! |

Timer time-out) ! (!DEEP SLEEP & ClkSrc=X0XX). If a Fault is asserted, the State Machine will transition to a Fault State.

WAIT PLL STATE

In the Wait PLL State, the following system state variables are:
IDLE=True
Sleep=True
Power=True
Oscillator=True
PLL=True

| | |
|---|---|
| If (ClkSrc = 1XXX) | Sys clocks = False |
| If (ClkSrc ! = 0000) | Low Speed Clocks = True |
| If (RW = 1) | Core Reset = True |
| If (DEEP SLEEP) | Sys Clocks = False |
| If (CPO = 1) | Core Reset = True |

Wait for (Fault ! PLL Lock ! Timer time-out) ! (!DEEP SLEEP & ClkSrc=XXX0). If a Fault is asserted the State Machine will transition to the Fault State. On transition to Run Clear SlpReq Register field.

FAULT TRANSITION STATE

This is a transient state that forces the system into a Fault Mode from certain Power Management States (Sleep, exiting Sleep).

If Fault is asserted while exiting Sleep Mode, the state machine state causes:

IDLE=True
Sleep=True
Set ReqSlp=DEEP SLEEP
Set RW=True if a DRAM system
Set MSB of ClkSrc=1 (1XXX)

| | |
|---|---|
| If (ClkSrc = 1XX1) | PLL = False |
| If (ClkSrc = 1101) | Oscillator = False |
| If (ClkSrc ! = 0000) | Low Speed Clocks = True |
| IF (DEEP SLEEP) | Sys Clocks = False |
| | PLL = False |
| If (CPO = 1) | Power = False |
| | Core Reset = True |

RESET STATE

In the Reset state, the following system state variables are:
IDLE=True
Sleep=True
Power=True
Oscillator=True
PLL=False

| | |
|---|---|
| If (ClkSrc = 1101), | Oscillator = False |
| If (ClkSrc ! = 0000) | Low Speed Clocks = True |
| IF (DEEP SLEEP) | Sys Clocks = False |
| | PLL = False |
| If (CPo = 1) | Power = False |
| | Core Reset = True |

Obviously, many modifications and variations of the present invention are possible in light of the above teachings. Thus, it is to be understood that, within the scope of the appended claims, the invention may be practiced otherwise than as specifically described above.

What is claimed is:

1. A microcontroller management system, comprising:
   a bus;
   a power management subsystem configured to send a global power management command to one or more microcontroller subsystems through the bus, the global power management command to control power modes of the one or more microcontroller subsystems;
   one or more bus interfaces corresponding to the one or more microcontroller subsystems, each bus interface coupling a corresponding microcontroller subsystem to the bus, each bus interface to receive the global power management command, each bus interface including a register for configuring a response of a corresponding microcontroller subsystems to the global power management commands, the response of a corresponding microcontroller subsystem being independent of responses of other ones of the one or more microcontroller subsystems to the global power management command; and
   an application to configure each register to optimize the response of a corresponding microcontroller subsystem to the global power management command.

2. The microcontroller management system of claim 1, wherein the power management subsystem includes a state machine for generating the power management command to control power modes of the one or more microcontroller subsystems.

3. The microcontroller management system of claim 1, wherein the application is an application program or an operating system.

4. The microcontroller management system of claim 2, wherein the power management command generated by the state machine is a SLEEP command, the SLEEP command being an assertion to a microcontroller subsystem to switch to a sleep mode configuration.

5. A microcontroller, comprising:
   a CPU core;
   a bus;
   a plurality of peripheral devices, each peripheral device including a bus interface and configured to communicate with the CPU core through the bus; and
   a management subsystem configured to generate and provide power management controls to each of the plurality of peripheral devices through the bus and a corresponding bus interface, the power management controls to control power modes of each of the peripheral devices,
   wherein the power modes for each of the plurality of peripheral devices is configurable through each corresponding bus interfaces.

6. The microcontroller of claim 5, wherein the management subsystem is a modular management subsystem, the modular management subsystem to support addition of additional subsystems without a need for a new integrated circuit for the microcontroller to be designed.

7. The microcontroller of claim 5, wherein each bus interfaces includes a power management configuration registers, each power management configuration register to allow a corresponding peripheral device to respond independently to the power management controls.

8. The microcontroller of claim 7, wherein the management subsystem includes a state machine for controlling the power mode of each of the plurality of peripheral devices.

9. The microcontroller of claim 8, wherein the power mode comprises a SLEEP mode, a RUN mode, an IDLE mode, and a DEEP SLEEP mode.

10. The microcontroller of claim 9, wherein each of the plurality of peripheral devices is fully operational as enabled by a corresponding configuration register during the RUN mode.

11. The microcontroller of claim 10, wherein the CPU core is stopped but local memory is accessible to one or more peripherals devices during the IDLE mode.

12. The microcontroller of claim 11, wherein the CPU core is stopped and may be unpowered, the local memory is accessible to enabled ones of the plurality of peripheral devices, and a clock PLL may be disabled during the SLEEP mode.

13. The microcontroller of claim 12, wherein the CPU core is stopped and may be unpowered, the local memory is unaccessible, and the PLL is disabled during the DEEP SLEEP mode.

14. The microcontroller of claim 8, wherein the state machine includes a configurable register to enable the state machine to be configured for device and application specific applications.

15. A method of providing power management functions in a microcontroller having one or more subsystems and a CPU core, the method comprising:
   generating a global power management command in a power management subsystem, the global power management command to control power modes of each of the one or more subsystems;

sending the global power management command to each of the one or more subsystems through a bus;

individually configuring a response of each of the one or more subsystems to the global power management command through a corresponding registers in each of the one or more subsystems, and configuring each of the one or more subsystems to support one of RUN, IDLE, SLEEP, and DEEP SLEEP power modes based on the individual response of each of the one or more subsystems.

16. The method of claim 15, wherein the response of each of the one or more subsystems to the global power management command is individually configured by an application program or operating system.

17. The method according to of claim 15, wherein generating a global power management command comprises generating a global power management command through a power management state machine for controlling the power mode of the one or more subsystems.

18. The method according to of claim 17, wherein configuring each of the one or more subsystems to support one of RUN, IDLE, SLEEP, and DEEP SLEEP power modes comprises configuring each of the one or more subsystems independently of others of the one or more subsystems.

19. A System-on-Chip, comprising:
a modular power management system, the modular power management system including:
a bus;
a power management subsystem configured to send a global power management command to one or more microcontroller subsystems through the bus, the global power management command to control power modes of the one or more microcontroller subsystems; and
one or more bus interfaces corresponding the one or more microcontroller subsystems, each bus interface coupling a corresponding microcontroller subsystem to the bus, each bus interface to receive the global power management command, each bus interface including a register for configuring a response of a corresponding microcontroller subsystem to the global power management command, the response of a corresponding microcontroller subsystem being independent of responses of other ones of the one or more microcontroller subsystems to the global power management command;
wherein the modular power management system can support addition of additional subsystems without a need for a new integrated circuit for the System-on-Chip to be designed.

20. The System-on-Chip of claim 19, wherein an application program configures each register to optimize the response of a corresponding microcontroller subsystem to the global power management command.

21. The System-on-Chip of claim 19, wherein an operating system configures each register to optimize the response of a corresponding microcontroller subsystem to the global power management command.

22. A power management subsystem for use in a microcontroller or System-on-Chip having one or more subsystems, the power management subsystem comprising:
a configuration unit configured to send a global power management command to a CPU and the one or more subsystems through a bus, the global power management command to control power modes of the CPU and the one or more subsystems, each of the one or more subsystems to respond independently to the global power management command; and
a register adapted to configure the configuration unit to support a specific application.

23. The power management subsystem of claim 22, wherein the power management subsystem includes a state machine for generating the power management command to control power modes of the CPU and the one or more subsystems.

24. The power management subsystem of claim 23, wherein the power modes include a RUN mode, an IDLE mode, a SLEEP mode, and a DEEP SLEEP mode.

* * * * *

UNITED STATES PATENT AND TRADEMARK OFFICE
CERTIFICATE OF CORRECTION

PATENT NO. : 6,665,802 B1
DATED : December 16, 2003
INVENTOR(S) : Robert E. Ober It is certified that error appears in the above-identified patent and that said Letters Patent is hereby corrected as shown below:

Column 19,
Line 57, please delete "subsystems" and insert -- subsystem -- therefor.
Line 58, please delete "commands" and insert -- command -- therefor.

Column 20,
Lines 26 and 33, please delete "interfaces" and insert -- interface -- therefor.
Line 34, please delete "registers" and insert -- register -- therefor.
Line 49, please delete "peripherals" and insert -- peripheral -- therefor.

Column 21,
Line 7, please delete "registers" and insert -- register -- therefor.
Lines 17 and 23, please delete "according to".

Signed and Sealed this

Twenty-second Day of June, 2004

JON W. DUDAS
*Acting Director of the United States Patent and Trademark Office*